United States Patent [19]

Josis et al.

[11] 4,160,725
[45] Jul. 10, 1979

[54] WASTE WATER PURIFICATION PROCESSES

[75] Inventors: Christian Josis, Gembloux; André Hans, Waremme, both of Belgium

[73] Assignees: Centre de Recherches Metallurgiques-Centrum voor Research in de Metallurgie, Brussels; Siderurgiemaritime-Maritime Staalnijverheid, Gent, both of Belgium

[21] Appl. No.: 889,481

[22] Filed: Mar. 23, 1978

[30] Foreign Application Priority Data

Mar. 25, 1977 [LU] Luxembourg ............................ 77015

[51] Int. Cl.² .......................... B01D 11/04; C01C 1/02
[52] U.S. Cl. ......................................... 210/21; 210/61; 568/760; 423/356
[58] Field of Search ................... 423/415 R, 356, 357, 423/188, 237, 238; 210/21, 22, 59, 61; 568/757, 760, 761

[56] References Cited

U.S. PATENT DOCUMENTS

| 1,378,593 | 5/1921 | MacMahon | 423/356 |
| 1,838,587 | 12/1931 | Sperr, Jr. | 423/357 |
| 1,873,900 | 8/1932 | Miller | 568/760 |
| 2,781,244 | 2/1957 | Hecklinger | 423/357 |
| 3,855,076 | 12/1974 | Marecaux | 210/59 |
| 4,061,718 | 12/1977 | Verlaften et al. | 423/356 |

*Primary Examiner*—Thomas G. Wyse
*Assistant Examiner*—David R. Sadowski
*Attorney, Agent, or Firm*—Holman & Stern

[57] ABSTRACT

Waste water from coke ovens is purified by passing the waste water and a stripping fluid through a stripping column in counterflow. Non-volatile ammonium compounds are removed in one region of the column, phenolic compounds are removed in another region, and volatile ammonium compounds are removed in yet another region. The region in which phenolic compounds are removed is disposed at such a location that no ammoniacal vapor can traverse it. An acid and a strong base are fed laterally into the column at two different levels.

6 Claims, 2 Drawing Figures

WASTE WATER PURIFICATION PROCESSES

FIELD OF THE INVENTION

This invention relates to a method of operating a stripping column for purifying waste water, applicable in particular to the purification of waste water from coke ovens.

BACKGROUND OF THE INVENTION

At the present time the most widely used process for purifying waste water from coke ovens consists of firstly removing volatile mineral compounds ($NH_3$, $HCN$, $H_2S$, $CO_2$) and a small fraction of phenolic compounds by distillation or by entrainment in live steam (stripping), with simultaneous treatment with lime or soda to release ammonia from fixed salts. The water is subsequently freed of the residual phenols and non-volatile compounds by biologocal oxidation in aeration tanks. The ammoniacal vapor is either decomposed in suitable incinerators with the controlled formation of nitrogen oxides, or treated with sulfuric acid to produce ammonium sulfate.

The desorption operation is of notable importance in the purification cycle for the waste water from coke ovens. Any deficiency in this operation leads in particular to the following well-known drawbacks:

(a) overloading of the biological tanks, where certain inhibition effects could undermine the effectiveness of the process;

(b) the need for additional finishing treatment before discharging the water into the natural environment (for example treatment by activated carbon);

(c) the risk of atmospheric pollution above the aeration tanks by entrainment of residual volatile matter.

It is apparent that the desorption operation, whether carried out by distillation or by stripping, must be proceeded with until practically complete if it is to be considered as completely effective. To this end, a process has already been proposed in which a stripping column is used containing substantially horizontal perforated plates disposed one above the other, the top of the column being fed with the waste water to be purified, the bottom of the column being fed with live steam and the column being fed laterally with a strong base at one or more levels. By means of this process, the ammonium salts, whether volatile or not, are removed nearly completely from the waste water, while the other compounds such as phenols are removed from the water by a biological oxidation process.

OBJECT OF THE INVENTION

The object of the invention is to provide a purification process for waste water, such as water from coke ovens, in which not only the ammonium compounds but also the phenols and like compounds are removed in the stripping column.

SUMMARY OF THE INVENTION

The invention is based on the observation that the facility for removing phenols from waste water in a stripping column is directly related to the acidity of the water to be processed. It therefore follows that the water can be freed of phenols by locally and adequately raising the acidity of the water to be processed in the column, and this represents the essential concept of the invention.

In practice, a stripping column of known type is used, which can be fed with a stripping fluid such as live steam, air, or a gas (for example combustion gases) which does not influence the reactions taking place inside the column. The column, however, instead of comprising only two main regions, namely the region in which the non-volatile ammonium compounds are released and the overlying region in which the volatile ammonium compounds are removed, comprises a third region in which the phenols or like compounds are removed, the said third region being disposed in such a manner that no ammoniacal vapor can traverse it.

Preferably a stripping column is used containing a certain number of substantially horizontal perforated plates disposed one above the other, the column being fed at its top with the waste water to be purified, and at its bottom with a stripping fluid. A strong base is laterally fed into the column at at least one level into the region for decomposition of the fixed ammonium salts, and an acid such as $HCl$ or $H_2SO_4$ is laterally fed into the column at at least one other level into the region for removal of the phenols.

According to one preferred procedure, strong bases are fed into the column at a point where the water pH, which decreases from the top of the column, lies between 6 and 7 so as to raise this pH to a value between 10 and 11.5, and acid is fed at a level, lower than that at which the strong bases are fed, where the pH has fallen to between 8 and 9 so as to reduce this pH to between 2 and 5. According to this procedure, the column comprises successively, from the bottom to the top, the phenol removal region, the fixed ammonium compound removal region, and finally the volatile ammonium compound removal region. This embodiment has the advantage of consuming relatively little stripping fluid, because the same fluid fed into the bottom of the column successively traverses the three aforesaid regions. In this case, the stripped water has to be neutralised before disposal.

In an alternative procedure, acid is fed into the column at a point where the water pH, which decreases from the top of the column, lies between 6 and 7 so as to lower this pH to a value of between 2 and 5. The column is also fed with strong bases at a level lower than that at which the acid is fed but at which the pH still lies between 2 and 5, the region between these two feeds being fed directly with stripping fluid. The effect of the strong base feed is to raise the water pH to a value between 10 and 11.5 so as to remove the fixed ammonium compounds in the lowermost region of the column, which is fed (as previously) directly with the stripping fluid. The stripping fluid outlets from the two lower column regions open directly into the inlet to the uppermost column region where the volatile ammonium compounds are removed. This alternative procedure has the advantage of a lower consumption of reactants. It also has the important advantage of allowing the $CO_3^{--}$ ions present in the water to be removed by reaction with the $H^+$ ions provided by the acid, producing $CO_2$ and water. This prevents the formation of $CaCO_3$ which, by precipitating, would contribute substantially to incrusting the plant.

The feed of the acid, such as $HCl$, which results in a corresponding lowering of the pH of the solution, can be made directly into the column at the base of the region for stripping the volatile ammonium compounds and before the strong base (e.g. lime) treatment.

An intermediate region can also be provided between the region for stripping the volatile ammonium compounds and the region for stripping the fixed ammonium compounds, in which the pH continues to fall by virtue of the effect of the live stripping steam alone.

In both cases, the pH must be reduced preferably to less than 5.5 before the alkaline treatment. Furthermore, the intermediate region should preferably comprise at least two bubble plates in the case of HCl treatment and at least six plates in the other case.

Within the scope of the aforesaid process, it has been found that in both of the aforesaid procedures the presence of a low pH region favors removal not only of the phenols but also of the last traces of hydrocyanic acid, and this is one of the essential objects of stripping.

The acidity may be provided, as stated heretofore, by means for example of HCl or $H_2SO_4$, but it is advantageous that the aqueous acid contains Fe ions, which, by combining with the cyanide ions in the water, lead to the formation and precipitation of Prussian blue, thus at the same time facilitating the removal of the CN ions. From this point of view, it is particularly advantageous for the acid supplied to the column to comprise waste water from a pickling plant, or any other waste acid solution suitable for the aforesaid operation and preferably containing Fe ions.

Where the acid fed into the column comprises mainly sulfuric acid or a sulfate such as iron sulfate, and where the base fed into the column contains mainly $Ca(OH)_2$, $CaSO_4$ is advantageously formed with the Ca in excess, and this $CaSO_4$ on precipitating entrains some phenols with it and in particular the polyhydric phenolic compounds which cannot be entrained by the steam. In this manner, a true combination effect is obtained, with the $H_2SO_4$ feed in the presence of Ca facilitating the purification of the water both upwards by entrainment of the phenols and downwards by precipitation of the $CaSO_4$ and co-precipitation of the aforesaid compounds.

The accompanying diagrams, given by way of non-limiting example, show how the succession of operations required for the waste water purification can be effected, according to two alternative procedures.

DESCRIPTION OF EXAMPLES

Figure 1:
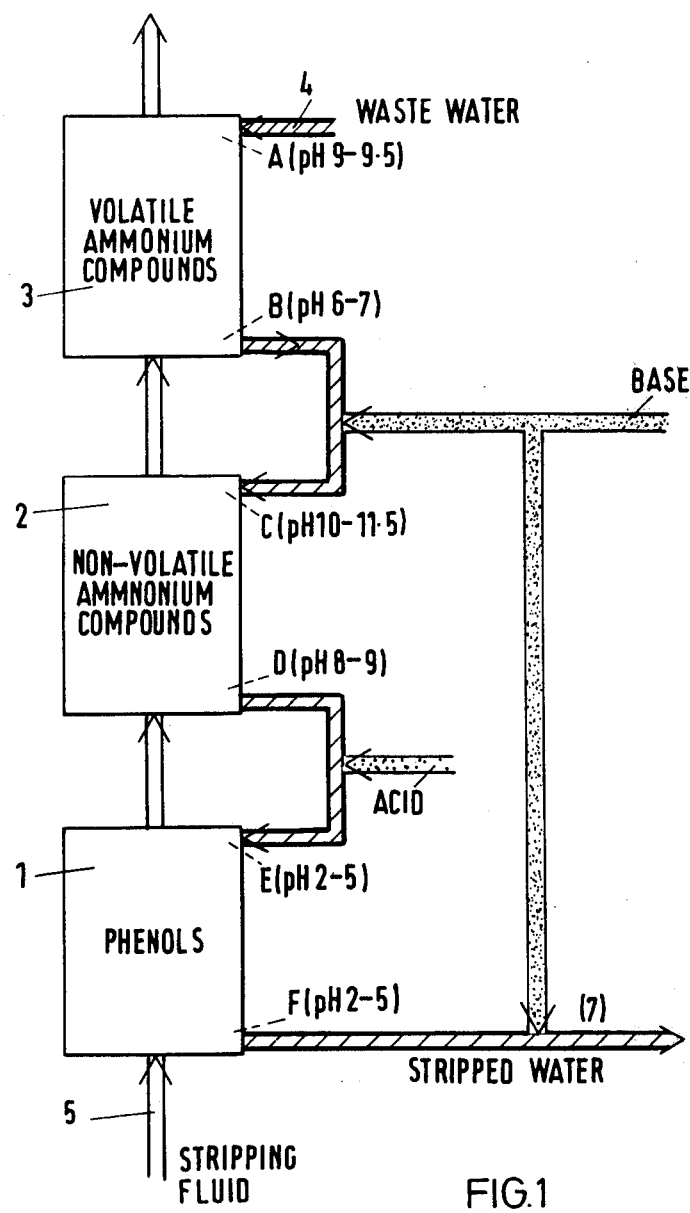
FIG. 1 shows a flow sheet of a first operating procedure according to the invention.

In FIG. 1, the reference numeral 1 indicates the region in which the phenolic compounds are removed, 2 the region in which the non-volatile ammonium compounds are removed, and 3 the region in which the volatile ammonium compounds are removed. The top of the stripping column composed of these three regions is fed at 4 with the waste water to be stripped, and the bottom of the column is fed at 5 with stripping fluid (live steam). The pH of the waste water is pH 9 to 9.5 at point A at the top of region 3, and falls to pH 6 to 7 at point B and at the bottom of region 3. A strong base feed at C raises the pH of the water to pH 10 to 11.5 at the top of region 2. The pH of the water falls to about pH 8 to 9 at D at the bottom of region 2. An acid feed at E causes the pH of the water to fall to pH 2 to 5 at the top of region 1. The waste water, having a pH of 2 to 5, leaves the bottom of region 1 and is neutralised, for example to pH 7, by a base tapped off from feed C.

Figure 2:
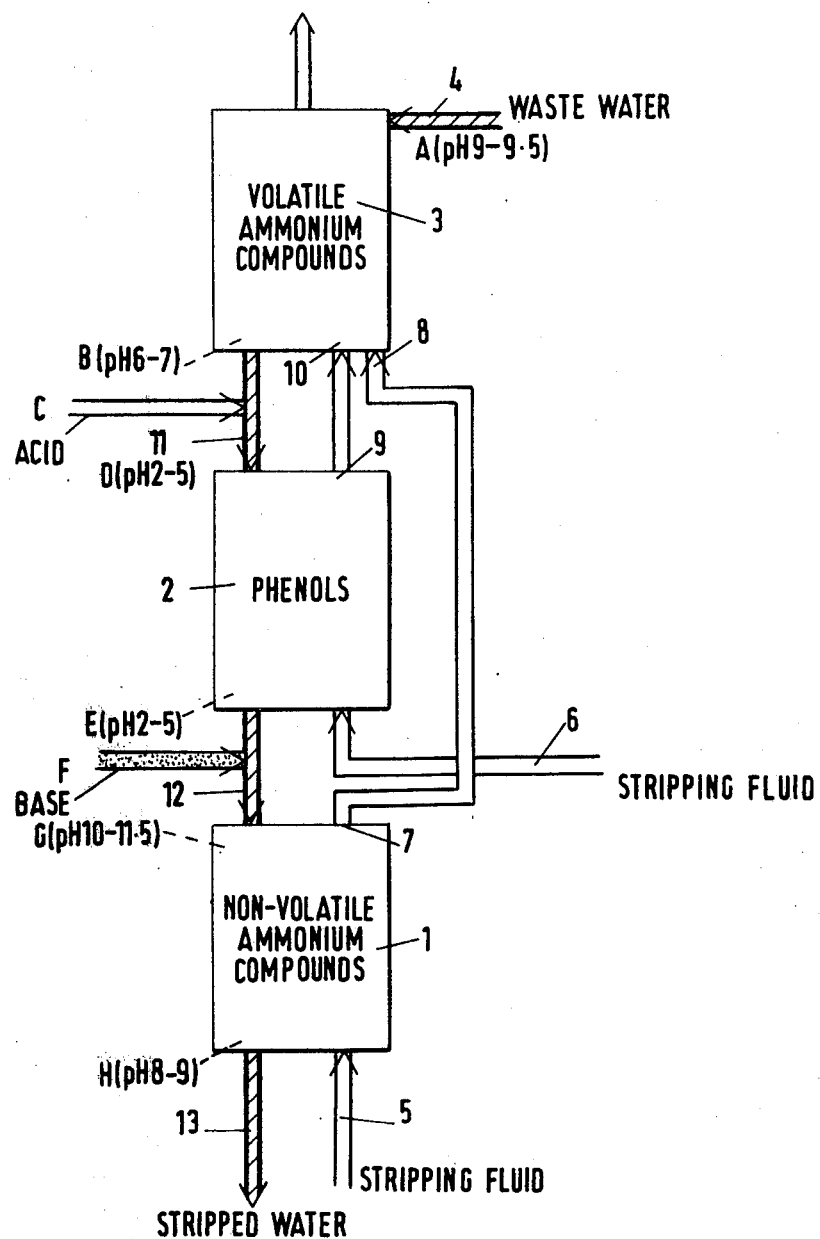
FIG. 2 shows a flow sheet of a second operating procedure according to the invention.

In FIG. 2, reference numeral 1 represents the region in which the non-volatile ammonium compounds are removed, 2 the region in which the phenols are removed, and 3 the region in which the volatile ammonium compounds are removed. The top of the stripping column comprising these three regions is fed at 4 with the waste water to be purified, the bottom of the column is fed at 5 with stripping fluid, and the column is also laterally fed at 6 at the bottom of region 2 with the stripping fluid. The stripping fluid leaves at 7 at the top of region 1 and is fed to 8 into the bottom of region 3. Stripping fluid leaves the region 2 at 9 and is fed at 10 into the region 3. The stripped water flows successively from region 3 to region 2 through a conduit 11 and from region 2 to region 1 through a conduit 12.

The pH of the waste water is pH 9 to 9.5 at the top of region 3 (point A), and falls to pH 6 to 7 at B. An acid feed at C causes the pH of the water to fall to pH 2 to 5 at D at the top of region 2. This pH is maintained until E at the bottom of region 2. A strong base feed at F raises the pH of the water to pH 10 to 11.5 at the top of region 1. At the bottom of region 1 the pH of the water has fallen to 8 to 9, and the stripped water is discharged from region 1 through an outlet 13.

In the foregoing description and in the claims given hereinafter, the numerical indications of the pH are given by way of non-limiting example, in order to enable the various stages of purification to be understood.

We claim:

1. A method of operating a stripping column for purifying waste water containing ammonium compounds and phenolic compounds, comprising passing waste water and stripping fluid through the column in counterflow; defining in the column a first region in which non-volatile ammonium compounds are removed from the waste water, defining in the column a second region in which phenolic compounds are removed from the waste water, defining in the column a third region in which volatile ammonium compounds are removed from the waste water; and disposing the second region at a location in the column such that ammoniacal vapor cannot traverse it.

2. The method of claim 1, in which the stripping column contains substantially horizontal perforated plates disposed one above another, and the method includes feeding waste water into the top of the column, feeding stripping fluid into the bottom of the column, feeding a strong base laterally into the column at at least one level into the said first region, and feeding an acid laterally into the column at at least one other level into the said second region.

3. The method of claim 1, including feeding a strong base into the column at a level where the water pH, which decreases from the top of the column, has a value of 6 to 7 so as to raise its pH to a value of 10 to 11.5, and feeding an acid into the column at a level, lower than that at which the strong base is fed in, where the pH has fallen to a value of 8 to 9 so as to reduce this pH to a value of 2 to 5, the column comprising successively, from the bottom to the top, the said second region, the said first region, and the said third region.

4. The method of claim 1, including feeding an acid into the column at a level in which the water pH, which decreases from the top of the column, has a value of 6 to 7 so as to lower its pH to a value of 2 to 5, and feeding a strong base into the column at a level lower than that at which the acid is fed in but at which the pH still has a value of 2 to 5, feeding the region between the two said levels directly with stripping fluid, feeding lowermost region directly with stripping fluid, and connecting stripping fluid outlets from the two lower regions directly into an inlet to the uppermost region.

5. The method of claim 4, wherein the acid comprises at least one compound selected from the group consisting of sulfuric acid and iron sulfates, and the strong base comprises $Ca(OH)_2$.

6. The method of claim 4, including feeding in sufficient acid to ensure that all carbonate ions in the water will react with the hydrogen ions supplied by the acid to produce carbon dioxide and water.

* * * * *